(12) United States Patent
Teramoto et al.

(10) Patent No.: US 7,842,332 B2
(45) Date of Patent: Nov. 30, 2010

(54) METHOD FOR INTERMITTENTLY APPLYING THIN-FILM COATINGS

(75) Inventors: Kazutaka Teramoto, Kanagawa (JP); Tetsuya Hayashi, Osaka (JP)

(73) Assignee: Panasonic Corporation, Osaka (JP)

( * ) Notice: Subject to any disclaimer, the term of this patent is extended or adjusted under 35 U.S.C. 154(b) by 477 days.

(21) Appl. No.: 11/791,663

(22) PCT Filed: Nov. 25, 2005

(86) PCT No.: PCT/JP2005/021641
§ 371 (c)(1), (2), (4) Date: Jun. 10, 2008

(87) PCT Pub. No.: WO2006/064646
PCT Pub. Date: Jun. 22, 2006

(65) Prior Publication Data
US 2009/0092742 A1    Apr. 9, 2009

(30) Foreign Application Priority Data
Nov. 26, 2004  (JP) .............................. 2004-341697
Sep. 28, 2005  (JP) .............................. 2005-281940
Nov. 15, 2005  (JP) .............................. 2005-329924

(51) Int. Cl.
*C23C 14/54* (2006.01)
(52) U.S. Cl. ............................ 427/9; 427/256; 427/288; 427/428.01; 427/428.21; 118/33; 118/120; 118/247; 118/253
(58) Field of Classification Search .................... 427/9, 427/256, 288, 428.01, 428.21; 118/33, 120, 118/247, 253
See application file for complete search history.

(56) References Cited

U.S. PATENT DOCUMENTS 1,982,697  A  *  12/1934  Royal ........................... 118/40
4,948,635  A  *  8/1990  Iwasaki ....................... 427/345

FOREIGN PATENT DOCUMENTS

JP          07-220759          8/1995

(Continued)

*Primary Examiner*—Michael Cleveland
*Assistant Examiner*—Nathan H Empie
(74) *Attorney, Agent, or Firm*—McDermott Will & Emery LLP

(57) ABSTRACT

A method for intermittently applying thin-film coatings is realized, by which a coating of extremely thin film reduced to 20 μm or less in thickness is deposited intermittently with high productivity and at the same time, the trailing coating edge of the thin film is formed in a highly accurate shape having good linearity. This is achieved as follows. A band-shaped substrate (1) traveling in one direction is kept looped over a stationary reference-roller (4) and a movable actuation roller (7), and is brought into contact with an application roller (19) which carries a coating agent (18) on its circumferential surface and rotates in a direction opposite to the direction of travel of the substrate (1). The actuation roller (7) is moved to come into or out of contact with the substrate (1) with a predetermined timing. A tension roller (8) is also controllably moved to come into or out of contact with the substrate (1), following the actuation roller (7) coming into or out of contact with the substrate (1), so that the tension applied to the substrate (1) is kept constant all the time.

19 Claims, 8 Drawing Sheets

FOREIGN PATENT DOCUMENTS

| | | |
|---|---|---|
| JP | 07-275786 | 10/1995 |
| JP | 08-131934 | 5/1996 |
| JP | 08-229481 | 9/1996 |
| JP | 09-099269 | 4/1997 |
| JP | 11-307087 | 11/1999 |
| JP | 2001-035483 | 2/2001 |
| JP | 2001-179151 | 7/2001 |
| JP | 2001-191005 | 7/2001 |
| JP | 2001-266943 | 9/2001 |

* cited by examiner

METHOD FOR INTERMITTENTLY APPLYING THIN-FILM COATINGS

RELATED APPLICATIONS

This application is the U.S. National Phase under 35 U.S.C. §371 of International Application No. PCT/JP2005/021641, filed on Nov. 25, 2005, which in turn claims the benefit of Japanese Application No. 2004-341697, filed on Nov. 26, 2004, Japanese Application No. 2005-281940, filed on Sep. 28, 2005, and Japanese Application No. 2005-329924, filed on Nov. 15, 2005 the disclosures of which Applications are incorporated by reference herein.

TECHNICAL FIELD

The present invention relates to a method for intermittently applying thin-film coatings, which is suitably used for depositing a coating of thin film, on the surface of a substrate shaped like an extra long sheet, in a predefined pattern in which coating deposited sections and non-coating deposited sections are present alternately intermittently.

BACKGROUND ART

Recently, to manufacture electronic components such as semiconductor devices or capacitors, a thin-film coating of paint or the like is fairly often deposited in a pattern on the surface of a band-shaped substrate. For example, it has been suggested for battery electrode plates that an active material layer is formed on the surface of a collector serving as a substrate, and then a porous protective film with a thickness of 0.1 μm to 200 μm or a porous protective film of coating film containing a resin binder and fine particulate solids such as alumina powder is formed to cover the aforementioned active material layer (for example, see Patent Document 1).

The aforementioned porous protective film is applied and deposited intermittently to cover the active material layer that has been applied and deposited in a pattern. To efficiently perform the step of intermittently depositing a coating of paint or the like on a substrate in this manner for volume production, such a step has been employed in which while a substrate shaped like an extra long sheet is traveling at a predetermined speed, paint or the like is intermittently applied and deposited on the substrate (for example, see Patent Document 2). In this intermittent coating method, a rotating coating roll carries a predetermined amount of slurry-state paint using a regulator. The extra long substrate is sandwiched between the coating roll and a backing roll disposed opposite thereto to travel on the backing roll, during which the paint layer on the coating roll is transferred and applied to the substrate. Meanwhile, at predetermined time intervals, the rotation axis of the backing roll is translated in a direction orthogonal to its axial center so that the substrate is spaced apart from the coating roll for a predetermined period of time, thereby forming a non-coating deposited section in which no paint is applied to the substrate.

On the other hand, a die coating scheme has also been conventionally used as another intermittent application means. This die coating method provides control such that paint subjected to pressure and thereby discharged from a die is applied and deposited onto the substrate, and the pressure applied to the paint is interrupted with predetermined timing and slightly reduced at the same time. This ensures that the discharge of the paint from the die is stopped, thereby allowing a thin film coating of paint to be deposited and formed on an intermittent basis.

However, any one of the aforementioned intermittent coating methods is suitable to efficiently deposit and form a coating of thin film relatively as thick as 20 μm or greater, but cannot be employed, due to its configuration, to form a porous protective film with a thickness of 20 μm or less for use such as for battery electrode plates. In contrast to this, there is a gravure coating method available as a technique for depositing a coating of 20 μm or less thin film. The method enables a coating agent to be applied to the entire surface of a thin substrate with very high accuracy and in a uniform thickness with reliability (for example, see Patent Document 3).

As shown in FIG. 9, in the aforementioned gravure coating method, a band-shaped substrate 40 is looped and supported under tension between a pair of freely rotatable attitude control rolls 41 and 42, which are disposed oppositely in parallel to each other, and allowed to travel in a direction orthogonal to the axial directions of both the attitude control rolls 41 and 42. A gravure roll 43, which has a gravure pattern (not shown) formed on its circumferential surface and is disposed below the substrate 40, is rotated at a circumferential velocity having a relative velocity to the substrate 40 while a coating agent is being applied so as to enter the grooves of the aforementioned gravure pattern from a coating agent feed nozzle assembly 44. At the same time, an excess of the coating agent is wiped off the surface of the gravure roll 43 with a doctor blade 47 before the coating agent is applied, thereby allowing a constant amount of the coating agent to be applied to the undersurface of the substrate 40.

In the aforementioned gravure coating method, an excessive amount of the coating agent applied to the grooves of the gravure pattern on the gravure roll 43 is wiped off with the doctor blade 47, thereby allowing an appropriate amount of the coating agent to be supplied into and fill in the grooves of the gravure pattern. In addition to this, since the direction of travel of the substrate 40 is opposite to the direction of rotation of the gravure roll 43 at the contact portion with each other, the gravure pattern slips in a reverse direction on the undersurface of the substrate 40, thereby allowing a thin coating of the coating agent to be uniformly smoothed and deposited on the entire undersurface of the substrate 40. It is thus possible to uniformly apply and form a thin film in a thickness of 20 μm or less.

Incidentally, the aforementioned gravure coating method is suitable to apply a relatively thin film reduced in thickness to 20 μm or less to an entire surface. However, in Patent Document 3, no description is made regarding an intermittent coating technique for intermittently applying coatings to form a thin film while non-coating deposited sections having no coating agent applied thereto are being provided.

A gravure coater of FIG. 9 may be used for intermittently applying coatings, in which included is a roll unit 50 having a travel path of the substrate 40 on a pair of attitude control rolls 41 and 42 and a pair of guide rolls 48 and 49, which are each rotatably disposed. The roll unit 50 is pivoted is about a rotational spindle 51 as the fulcrum to be alternately positioned at the position illustrated with a solid line in the figure and at the position illustrated with a chain double-dashed line. To realize this arrangement, it is contemplated that the substrate 40 is allowed to come into or out of contact with the gravure roll 43, or the entire assembly including the gravure roll 43, the coating agent feed nozzle assembly 44, and a coating agent carrying tank 52 may be configured to move up and down, so that the gravure roll 43 comes into or out of contact with the substrate 40. Alternatively, the attitude control roll 42 may be provided as a stationary reference roll, whereas the rotation axis of the other attitude control roll 41 is moved up and down so that the substrate 40 comes into or out of contact with the gravure roll 43.

However, this method involves an unnecessarily complicated arrangement for allowing the substrate 40 and the gravure roll 43 to come into or out of contact with each other, resulting in its responsivity being significantly reduced. It is thus impossible to apply intermittent coatings of thin film with high productivity. Furthermore, as shown in FIGS. 10A to 10B, the aforementioned bad responsivity during intermittent coating operation causes the substrate 40 and the gravure roll 43 to come into or out of contact with each other with bad stability. Thus, during coating operation, a thin film 53 intermittently applied and formed on the surface of the substrate 40 may be such that a trailing coating edge 53a in the direction of travel P of the substrate 40 is not in an accurate straight line, but becomes wavy along the width of the band-shaped substrate 40 and easily nonuniform in thickness. Such a problem that the trailing coating edge 53a is wavy and nonuniform in thickness in this manner becomes more noticeable particularly when employed is means for moving the other attitude control roll 42 to retreat the substrate 40 towards the backside thereof and advance it towards the frontside thereof, thereby allowing the substrate 40 to come into or out of contact with the gravure roll 43. This is because there occurs slack in the substrate 40 when the attitude control roll 42 is moved to retreat the substrate 40 towards the backside thereof, thereby releasing the pressure exerted on the substrate 40 against the gravure roll 43.

[Patent Document 1] Japanese Patent Laid-Open Publication No. Hei 7-220759

[Patent Document 2] Japanese Patent Laid-Open Publication No. Hei 8-131934

[Patent Document 3] Japanese Patent Laid-Open Publication No. 2001-179151

DISCLOSURE OF THE INVENTION

Problems to be Solved by the Invention

The present invention has been devised in light of the conventional problems mentioned above. It is therefore an object of the present invention to provide a method for intermittently applying thin-film coatings, by which a thin film is provided with a trailing coating edge formed in a highly accurate shape having good linearity even while the thin film is being deposited and formed intermittently with high productivity.

Means for Solving the Problems

To achieve the aforementioned object, a method for intermittently applying thin-film coatings according to the present invention provides control as follows. That is, a band-shaped substrate is looped on the backside thereof over a stationary reference roller and an actuation roller, which are disposed oppositely in parallel to each other; a portion to be applied with a coating agent is supported in parallel to the reference roller and the movable actuation roller and allowed to travel in one direction; and an application roller carrying a coating agent is brought into contact with the substrate halfway between the reference roller and the actuation roller so that the coating agent is transferred and deposited onto the surface of the substrate to thereby deposit and form a coating of thin film. Then, the actuation roller is moved with a predetermined timing to be retreated from the backside of the substrate to thereby separate the substrate from the application roller, and in synchronization with this, a tension roller is moved to advance towards the frontside of the substrate and thereby provide tension on the substrate. After that, the actuation roller is moved with a predetermined timing to be advanced towards the frontside of the substrate to bring the substrate into contact with the application roller; and in synchronization with this, the tension roller is moved to be retreated from the backside of the substrate to reduce the tension exerted on the substrate, and to form the thin film on the surface of the substrate on an intermittent basis. Then, for the tension applied to the substrate to be kept constant all the time, the tension roller is moved to be retreated from the backside of the substrate and to be advanced towards the frontside thereof so as to follow the actuation roller being moved to be retreated from the backside of the substrate.

According to this invention, when the actuation roller moves to retreat the substrate towards the backside thereof, the tension roller is controllably moved to the substrate to follow the movement of the actuation roller so that the tension applied thereto is maintained at a predetermined value. Accordingly, in the step of the actuation roller moving to retreat the substrate towards the backside thereof, it is possible to keep the substrate looped under tension between the reference roller and the tension roller with almost no slack present in the substrate. Furthermore, simple means only for moving the actuation roller so as to retreat the substrate towards the backside thereof and advance it towards the frontside thereof can be used to switch between a coating deposited section of the thin film and a non-coating deposited section, thereby allowing the switching with very good responsivity. In addition, the tension applied to the substrate when a transition is effected between the coating deposited section and the non-coating deposited section is controlled to be kept constant so as to prevent slack from occurring in the substrate, thereby allowing the coating agent to be uniformly applied to the substrate all the time. Thus, even when an extremely thin film with a thickness of 20 μm or less is formed on a substrate reduced in thickness, the trailing coating edge of the thin film is not wavy along the width of the substrate unlike the conventional case, but is accurately formed by application in the shape of a straight line with reliability.

In addition, another method for intermittently applying thin-film coatings according to the present invention is provided. In this method, a band-shaped substrate is looped on the backside thereof over a stationary reference roller and a movable actuation roller, which are disposed oppositely in parallel to each other, and over a backup roller which is disposed halfway between these two rollers; a coating agent applied portion is supported in parallel to the reference roller and the actuation roller; the backup roller is allowed to push the substrate at a predetermined contact pressure against an application roller disposed on the frontside of the substrate, allowing the substrate to travel in one direction; and a coating agent carried on the circumferential surface of the application roller is transferred to the surface of the substrate to deposit and form a coating of thin film. Then, the actuation roller is moved with a predetermined timing to be retreated from the backside of the substrate to thereby separate the substrate from the application roller, and in synchronization with this, a tension roller is moved to be advanced towards the frontside of the substrate and to thereby provide tension on the substrate, while the backup roller is moved to be retreated from the backside of the substrate and to thereby separate the substrate from the application roller. After that, the actuation roller is moved with predetermined timing to be advanced towards the frontside of the substrate, and in synchronization with this, the tension roller is moved to be retreated from the backside of the substrate to reduce the tension exerted on the substrate; and the backup roller is moved to advance the substrate towards the frontside thereof, allowing the substrate to be brought into contact with the application roller, thereby forming the thin film on the surface of the substrate on an intermittent basis.

According to this invention, even when the substrate travels faster, the substrate is pushed against the application roller by the backup roller so that the pressure to bring the substrate into contact with the application roller is maintained constantly at a predetermined value. It is thus possible to deposit the coating agent without unevenness in the coating thereof and uniformly with stability. In this manner, irrespective of the travel speed of the substrate, the deposited coating agent is formed into a thin film stably in a highly accurate shape without unevenness in the coating on the surface of the substrate. In addition, when the relatively wide substrate is used, most of the slack being produced in the substrate by the actuation roller moving to retreat the substrate towards the backside thereof is absorbed by the tension roller moving to advance the substrate towards the frontside thereof to thereby exert tension to the substrate. In addition, a slight wavy slack which is produced along the width of the wide band-shaped substrate due to the strain of the substrate caused during its manufacture is absorbed and thus prevented by the backup roller providing a predetermined tension over a region on the substrate between it and the tension roller. It is thus possible to form the trailing coating edge of the thin film in the shape of an accurate straight line without unevenness in the coating of the coating agent.

In the aforementioned another method for intermittently applying thin-film coatings, for the tension applied to the substrate to be kept constant all the time, the tension roller may be controllably moved to come into or out of contact with the substrate so as to follow the actuation roller moving to come into or out of contact with the substrate. The backup roller may also be controllably moved to follow the operation of the tension roller, thus allowing the backup roller to move to follow the operation of the tension roller. Accordingly, in particular, when the substrate used is relatively as wide as 500 mm or greater in width, the actuation roller moves away from the substrate, and a slight wavy slack to be produced along the width of the substrate when the substrate moves away from the application roller is absorbed by the backup roller with certainty and prevented with reliability. It is thus possible to form the trailing coating edges of the thin film in the shape of a further accurate straight line.

Furthermore, in either one of the aforementioned methods, the actuation roller and the tension roller are disposed in front of the application roller in a direction of travel of the substrate. This arrangement prevents wrinkle or slack from occurring in the substrate when the actuation roller moves to move the substrate towards the backside thereof.

Furthermore, in either one of the aforementioned methods, use of the application roller having a diameter of 40 mm to 60 mm allows the contact area between the application roller and the substrate to be significantly reduced. This makes it possible to apply the coating agent in a reduced thickness to the substrate uniformly with accuracy. Further, since the substrate comes into or out of contact with the application roller with improved stability, the positions at which application of the coating agent is started or stopped are set accurately. In addition, use of the application roller with a diameter of 40 mm or greater provides improved rigidity and processing accuracy, while use of the application roller with a diameter of 60 mm or less reduces the contact area with the substrate, which is necessary to apply the coating agent in a reduced thickness to the substrate uniformly with accuracy.

Furthermore, in any one of the aforementioned methods, the reference roller and the actuation roller may be disposed at their interaxial distance that is defined to be 1.2 times or greater than and 2.5 times or less than the diameter of the application roller. In this case, even with a substrate reduced in thickness, the reference roller and the actuation roller, which are closely disposed, provide only a slight tension to the substrate to retain it under good tension, never causing the substrate to be broken due to an excessive tension exerted thereon. In addition, the interaxial distance between the reference roller and the actuation roller may be set to be 1.2 times or greater than the diameter R of the application roller, thereby allowing for smoothly moving the actuation roller to retreat the substrate towards the backside thereof or advance it towards the frontside thereof. The interaxial distance may also be set to be 2.5 times or less than the diameter R of the application roller, thereby preventing a stretch, wrinkle, traction or the like from occurring in the substrate due to an excessive tension exerted thereon.

Furthermore, in either one of the aforementioned methods, the application roller used may have a number of coating agent retaining grooves which are inscribed on the entire circumferential surface thereof at a predetermined angle relative to the axial center of the application roller in parallel to each other. The application roller may be allowed to rotate in a direction opposite to the direction of travel of the substrate. Furthermore, a doctor blade may be pushed at a constant pressure against flat surface portions that are provided between the coating agent retaining grooves adjacent to each other on the application roller, thereby allowing an excess of the coating agent carried on the application roller to be scrubbed off. This makes it possible to adjust the coating agent carried on the application roller to a predefined amount of coating that is filled in the coating agent retaining grooves by scrubbing off an excess of the coating agent by the doctor blade. Furthermore, the application roller is rotationally driven in a direction opposite to the direction of travel of the substrate at the contact portion with the substrate to slip in a reverse direction relative to the substrate. Thus, the coating agent filled in the coating agent retaining grooves is transferred to the surface of the substrate while being evenly smoothed in a reduced thickness by the flat surface portions. In this manner, an extremely thin film reduced in thickness to 20 μm or less is formed on the surface of the substrate with high accuracy.

Furthermore, in either one of the aforementioned methods, a rotation axis and a spindle of the actuation roller can be interconnected to each other via an active coupling rod. Following the actuation roller moving along a pivotal path about the rotation axis as a fulcrum, the tension roller is made movable along the pivotal path about the fulcrum or the rotational spindle to which its own spindle is coupled via a coupling rod, thereby exerting a constant pressure onto the substrate and thus providing a constant tension to the substrate. This makes it possible to move the actuation roller and the tension roller to retreat the substrate towards the backside thereof and advance it towards the frontside thereof. The destination of travel and the travel distance of the actuation roller can also be variably set with ease depending on the type of the substrate or the coating agent, and the actuation roller is accurately controlled in accordance with the setting. On the other hand, while providing operational control in a simple configuration, the tension roller can also automatically adjust the tension exerted on the substrate so that the tension applied to the substrate is kept constant all the time.

Note that at that time, after a coating deposit layer is deposited and formed on the surface of the substrate on an intermittent basis, the leading coating edge and the trailing coating edge of the coating deposit layer may be detected with a sensor, and a second thin film that covers the entire coating deposit layer may be deposited and formed on an intermittent basis corresponding to the coating deposit layer. In this case, while the leading edge portion and the trailing edge portion of the coating deposit layer are being detected with the sensor, a thin film is deposited and formed on a region from just before the leading edge portion of the coating deposit layer to the vicinity behind the trailing edge portion based on the detected value. This allows for depositing and forming a thin film so as to cover the entire coating deposit layer with reliability, and thus the methods are suitably applied to the steps of manufacturing battery electrode plates.

Furthermore, in either one of the aforementioned methods, using copper foil or aluminum foil as the substrate, a battery active material layer may be deposited and formed as the coating deposit layer on the surface of the substrate, and a porous protective film may be deposited and formed as the second thin film on the entire surface of the coating deposit layer and on part of the substrate. This allows for manufacturing good battery electrode plates with high accuracy.

Furthermore, in any one of the aforementioned methods, a trailing edge portion of the thin film in the direction of travel of the substrate may be formed in the shape of a straight line along the width of the substrate and in a swelling shape that is slightly thicker than a predetermined film thickness. In particular, when the methods are applied to the steps of manufacturing battery electrode plates, the trailing coating edge of the porous protective film deposited and formed as a thin film may take a swelling shape, even in the case of which this swelling shape is formed on the substrate behind the trailing coating edge of the active material layer that is deposited and formed as the coating deposit layer. Thus, the tip of the swelling shape would never be higher than the top surface of the active material layer, and thus this will not inhibit its use as the battery electrode plate without causing any problem.

BRIEF DESCRIPTION OF THE DRAWINGS

FIG. 5C being an enlarged front view illustrating the application roller, a substrate, and an coating agent when the trailing coating edge of the porous protective film is formed;

BEST MODE FOR CARRYING OUT THE INVENTION

Figure 1:
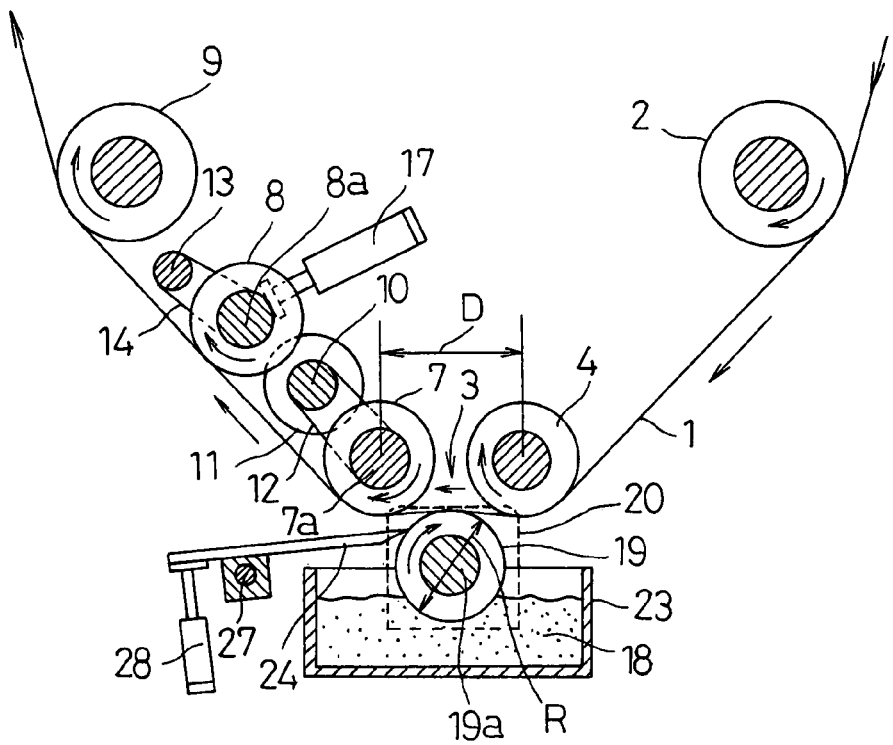
FIG. 1 is a schematic longitudinal sectional view illustrating a coating of thin film being deposited in an intermittent coating apparatus representative of an embodiment which embodies a method for intermittently applying thin-film coatings according to the present invention.
Figure 2:
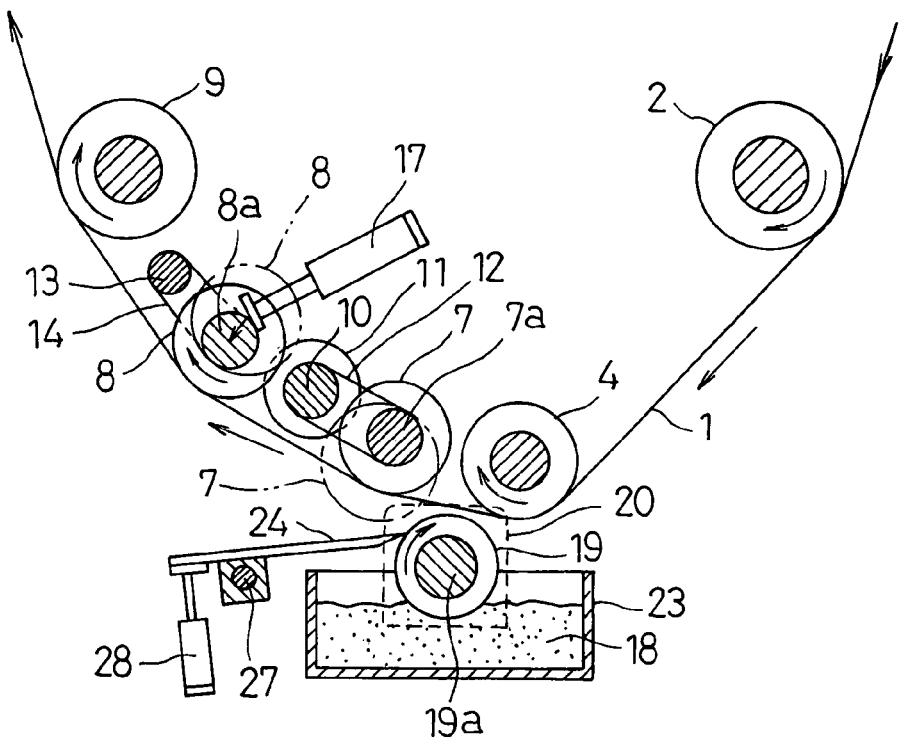
FIG. 2 is a schematic longitudinal sectional view illustrating a coating of thin film being not deposited in the intermittent coating apparatus.

A description will now be made to the present invention with reference to the accompanying drawings in accordance with the embodiments. FIGS. 1 and 2 are schematic longitudinal sectional views illustrating an intermittent coating apparatus which embodies a method for intermittently applying thin-film coatings according to an embodiment of the present invention. FIGS. 1 and 2 show a coating of thin film being deposited and a coating of thin film being not deposited, respectively. A substrate 1 is a thin sheet shaped like a band, and in this embodiment, the substrate 1 is allowed to travel from the right to the left in the figure as indicated with the arrows. That is, the substrate 1 is paid out from a feed, roll on the right of the figure (not shown); guided by the feed guide roller 2 to a coating station 3; allowed to travel horizontally with its backside looped under tension between a reference roller 4 and an actuation roller 7; and in the subsequent stage, while being held all the time under a constant tension applied by a tension roller 8 consistently to the backside thereof, wound up on a take-up roll (not shown) via a take-up guide roller 9. While any of the aforementioned feed guide roller 2, reference roller 4, actuation roller 7, tension roller 8, and take-up guide roller 9 is freely rotatably supported, the substrate 1 is conveyed by rotational force produced by a substrate feed motor (not shown) which drives the take-up roll.

The aforementioned reference roller 4 is rotatably fixed in place. The actuation roller 7 is adapted to move about a rotation axis 10 as the pivotal center so as to alternately stay at the positions indicated with a solid line and a chain double-dashed line in FIG. 2. That is, the actuation roller 7 is supported via a bearing (not shown) rotatably about a spindle 7a, while the spindle 7a is interconnected via an active coupling rod 12 to the aforementioned rotation axis 10 which is rotated with a rotational force exerted by an actuation roller pivoting servo motor 11. Accordingly, the spindle 7a on which the rotational force is exerted by the actuation roller pivoting servo motor 11 via the rotation axis 10 and the active coupling rod 12 pivots about the rotation axis 10 as the fulcrum. Thus, the actuation roller 7 is displaced alternately either to a position as shown in FIG. 1 to contact with the substrate 1 and advance it towards the frontside thereof or to another position as shown with a solid line in FIG. 2 to retreat the substrate 1 towards the backside thereof or to be further spaced apart from the substrate 1. This allows the actuation roller 7, when in contact with the substrate 1, to be exerted by the traveling force of the substrate 1 to rotate about itself as well as to be exerted by the rotational force of the actuation roller pivoting servo motor 11 to pivot along the pivotal path about the rotation axis 10 as the fulcrum. Although not illustrated, note that while being guided along guide holes provided archwise on a guide plate, the spindle 7a of the actuation roller 7 is adapted to move to the aforementioned two positions smoothly with stability.

On the other hand, the tension roller 8 is supported via a bearing (not shown) rotatably about a spindle 8a, while the spindle 8a is interconnected via a coupling rod 14 to a pivotal spindle 13 that is rotatably supported, thereby being allowed to pivot about the pivotal spindle 13 as the fulcrum. This allows the tension roller 8 to be acted upon by the traveling force of the substrate 1 to rotate about itself as well as to rotate along the pivotal path about the pivotal spindle 13 as the fulcrum. Although not illustrated, note that while being guided along guide holes provided archwise on a guide plate, the spindle 8a of the tension roller 8 is adapted to move smoothly with stability. Furthermore, a pressure from an air cylinder 17 is applied to the aforementioned tension roller 8 via the spindle 8a, thereby allowing a constant tension to be exerted all the time on the backside of the substrate 1. This will be described below in more detail.

Figure 4A:
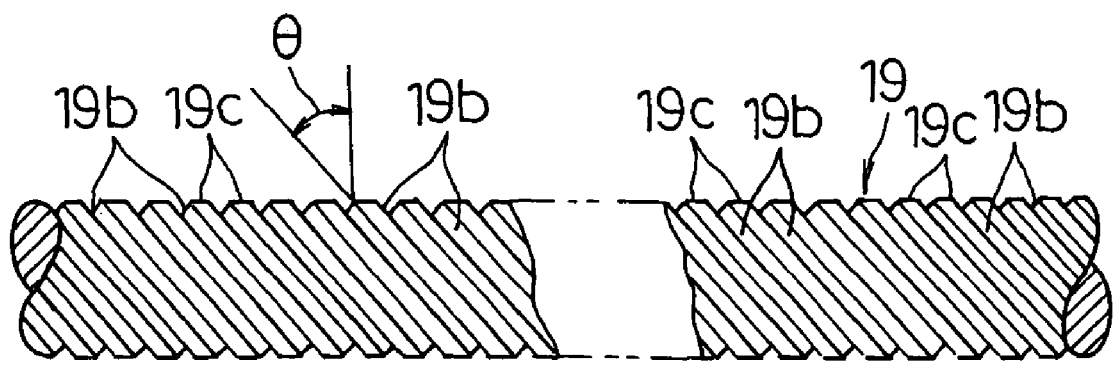
FIGS. 4A to 4B are views illustrating an application roller in the intermittent coating apparatus, FIG. 4A being a side view and FIG. 4B being a partial enlarged sectional view.
Figure 4B:
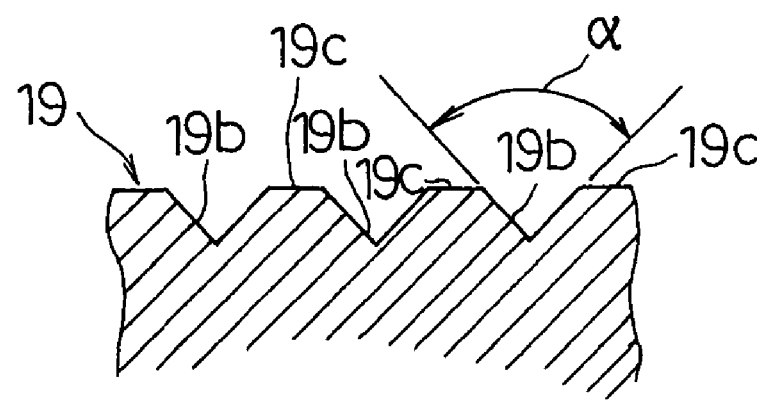

On the front surface side of the substrate 1, more specifically, below the substrate 1 at a midpoint between the reference roller 4 and the actuation roller 7 which are disposed oppositely in parallel to each other, an application roller 19 is provided for transferring and depositing a coating of a coating agent 18 onto the downward surface of the substrate 1 as shown in FIGS. 1 and 2. The application roller 19 is subjected at its own rotation axis 19a to the rotational force of an application roller rotating motor 20 via a reduction gear (not shown) and a coupling (not shown), thereby being rotated at the contact portion with the substrate 1 in the direction opposite to the travel direction of the substrate 1. As shown in FIG. 4A, on the entire outer circumferential surface of the application roller 19, a number of coating agent retaining grooves 19b are inscribed in parallel to each other at a predetermined angle θ (45 degrees in this embodiment) relative to the axial center of the application roller 19. As shown in FIG. 4B, the coating agent retaining grooves 19b are shaped in cross section like a letter V having a predetermined opening angle α (90 degrees in this embodiment) and disposed at regular intervals with a flat surface portion 19c of a predefined width interposed therebetween. For example, the coating agent retaining grooves 19b are formed in a predefined pattern on the circumferential surface of the application roller 19 by means of such as laser engraving.

The application roller 19 is disposed to rotate with its own lower end portion soaked in the coating agent 18 stored within a coating agent storage container 23, and when rotated while being soaked in the coating agent 18, carries the coating agent 18 filled in the coating agent retaining grooves 19b. After an excess of the coating agent 18 has been scrubbed off with a doctor blade 24, the coating agent 18 carried on the circumferential surface of the application roller 19 in this manner is transferred and deposited onto the undersurface of the substrate 1. The aforementioned doctor blade 24 is pivotally forced by an air cylinder 28 to allow the distal end portion to come into contact with the application roller 19 while the proximal end portion is supported like a cantilever rotatably about a support shaft 27. This causes the distal end portion of the doctor blade 24 to be pushed by the air cylinder 28 against the flat surface portion 19c of the application roller 19 all the time under a constant pressure. Accordingly, the application roller 19 is allowed to carry only a predefined amount of coating of the coating agent 18 that is defined by the cross-sectional area of the coating agent retaining grooves 19b.

Note that the doctor blade 24 is formed of resin in this embodiment, and thus will not cause the application roller 19 to wear in an early stage unlike one formed of metal.

Figure 3:
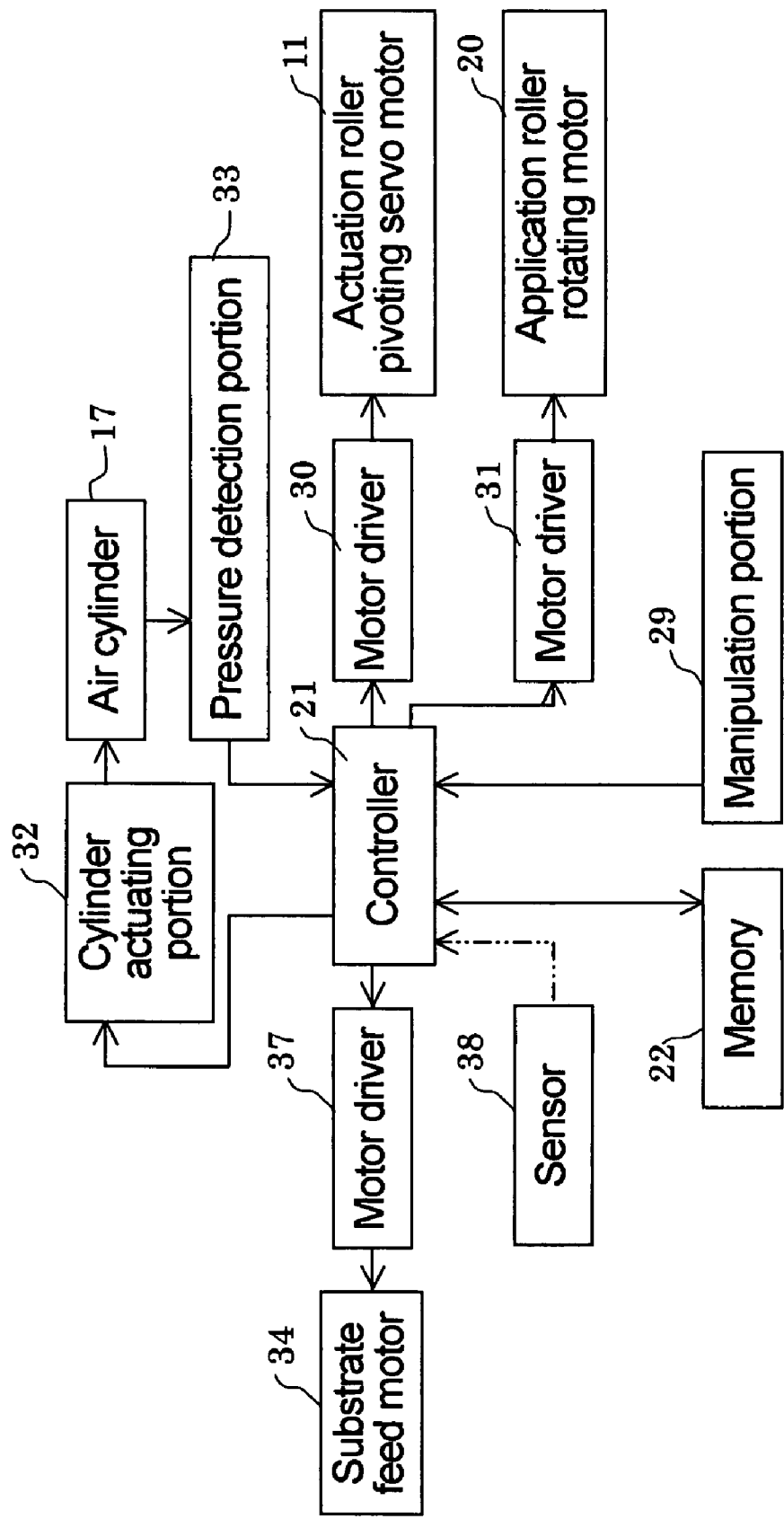
FIG. 3 is a block diagram illustrating a drive control system in the intermittent coating apparatus.

FIG. 3 is a block diagram illustrating a drive control system in the aforementioned intermittent coating apparatus. In the figure, the same components as those of FIGS. 1 and 2 will be indicated with the same symbols and not explained repeatedly. A controller 21 has, for example, a microcomputer to control the entire apparatus. Based on data defined and stored in advance in a memory 22 through manipulation of a manipulation portion 29, the controller 21 provides rotational control to the actuation roller pivoting servo motor 11 of FIGS. 1 and 2 via a motor driver 30, thereby allowing the actuation roller 7 to move to a desired position. The aforementioned memory 22 has data pre-stored therein such as each length of the coating deposited section and the non-coating deposited section of thin film to be formed, and the destination of travel and the travel distance of the actuation roller 7 according to the type of the substrate 1 and the coating agent 18. The controller 21 provides control such that the actuation roller 7 moves by a distance corresponding to data read from the memory 22 with the timing based on that data.

The aforementioned controller 21 also provides rotational control to the application roller rotating motor 20 of FIGS. 1 and 2 via a motor driver 31 based on data read from the memory 22 to rotate the application roller rotating motor 20 at a rotational speed corresponding to that data. The controller 21 further actuates the air cylinder 17 of FIGS. 1 and 2 via a cylinder actuating portion 32 with the timing at which rotational control is provided to the actuation roller pivoting servo motor 11. The controller 21 thus starts control such that the tension roller 8 is moved or displaced to come into or out of contact with the substrate 1, i.e., allowing the substrate 1 to retreat towards the backside thereof or to advance towards the frontside thereof. The controller 21 also provides feedback control to the air cylinder 17 via the cylinder actuating portion 32 so that an air pressure detection portion 33 which detects the air pressure of the air cylinder 17 provides a constant detected value all the time. Furthermore, via a motor driver 37, the controller 21 provides rotational control to the substrate feed motor 34 which drives the take-up roller and/or the feed roller, thereby allowing the substrate 1 to travel at a predetermined travel speed.

Now, description will be made to the configuration of the aforementioned intermittent coating apparatus in detail and to the steps of intermittent coating. The controller 21 of FIG. 3 provides rotational control to the substrate feed motor 34 via the motor driver 37, thereby allowing the substrate 1 to travel in the direction indicated by the arrows of FIGS. 1 and 2 at a predetermined speed. The controller 21 further provides rotational control to the servo motor 11 via the motor driver 30 based on data read from the memory 22 so that the actuation roller 7 is alternately located at either of the positions indicated with the solid line and the chain double-dashed line of FIG. 2. The controller 21 also provides feedback control to the air cylinder 17 via the cylinder actuating portion 32 so that the air pressure detection portion 33 of FIG. 3 provides a detected air pressure at a predetermined value. The controller 21 also provides variable control to the tension exerted by the tension roller 8 on the substrate 1 so that the tension exerted on the traveling substrate 1 is constant all the time. The controller 21 further provides rotational control to the application roller rotating motor 20 via the motor driver 31, thereby allowing the application roller 19 to rotate at a predetermined constant speed.

As clearly illustrated in FIG. 1, when the actuation roller 7 is positioned flush with and opposite to the reference roller 4 to be in contact with the substrate 1, the coating agent 18 filled in the coating agent retaining grooves 19b of the application roller 19 is transferred and applied to the region of the substrate 1 which is looped and traveling horizontally under tension between the reference roller 4 and the actuation roller 7. In this manner, the coating agent 18 applied and deposited is formed into a thin film on the undersurface of the substrate 1.

At this time, the coating agent 18 transferred from the application roller 19 to the substrate 1 is adjusted to a predefined amount of coating filled mainly in the coating agent retaining grooves 19b. This is achieved by scrubbing off an excess of the coating agent 18 with the doctor blade 24 which is automatically adjusted all the time by the air cylinder 28 to a constant pressure and pushed against the flat surface portion 19c of the application roller 19. On the other hand, the application roller 19 is rotationally driven in a direction opposite to the direction of travel of the substrate 1, thereby causing a slip in a direction opposite to the substrate 1 at the contact portion with the substrate 1. Thus, the coating agent 18 filled in the coating agent retaining grooves 19b is transferred and applied to the undersurface of the substrate 1 while being smoothed to be evenly thin by the flat surface portion 19c. Thus, it is possible to form an extremely thin film reduced in thickness to 20 μm or less with high accuracy on the undersurface of the substrate 1.

The thickness of thin film that is to be formed is adjusted by the rotational speed of the application roller 19 and the groove depth of the coating agent retaining grooves 19b to be thereby set to a predetermined value with accuracy. Here, with increasing rotational speeds of the application roller 19, the amount of supply of the coating agent 18 increases causing an increase in the thickness of the thin film. On the other hand, with increasing groove depths of the coating agent retaining grooves 19b of the application roller 19 used, the amount of supply of the coating agent 18 increases resulting in the thickness of the thin film being increased.

On the other hand, the coating agent retaining grooves 19b are formed in abundance at an angle to the axial center of the application roller 19, and the application roller 19 is rotationally driven in a direction opposite to the direction of travel of the substrate 1. This allows a coating of thin film to be deposited and formed on the substrate 1 as follows. That is, there is produced a small accumulation of coating agent past the contact point between the application roller 19 and the substrate 1 in the direction of travel thereof. The coating agent in the accumulation of coating agent is guided in a direction opposite to the travel direction, thereby allowing the coating to be uniform and have a smooth exact surface without leaving any groove marks of the coating agent retaining grooves 19b on the surface. The thickness of this thin film is readily fine-tuned by varying the relative speed difference between the substrate 1 and the application roller 19. In this embodiment, the relative speed difference between the circumferential speed of the application roller 19 and the travel speed of the substrate 1 is set to a rotational speed of 200 to 500% of the travel speed for rotational drive, thereby allowing even a thin film extremely reduced but accurately leveled in thickness to be formed with high accuracy.

When the relative speed difference is less than 200%, the groove pattern of the application roller 19 would be reflected to provide nonuniform coatings, while the coating agent 18 would be scattered around when it is 500% or greater.

The application roller 19 used may be preferably small in size and have a diameter R (FIG. 1) ranging from 40 mm to 60 mm; the application roller 19 employed in this embodiment is 50 mm in diameter R and 600 mm in length along the axial center. Use of the application roller 19 having such a small diameter R makes the contact area with the undersurface of the substrate 1 very small. This allows for accurately applying the coating agent 18 to the substrate 1 uniformly in a reduced thickness as well as for accurately defining the start and stop positions of application of the coating agent 18. The application roller 19 of a diameter within the range from 40 mm to 60 mm is employed because a diameter of 40 mm is the lower limit for the application roller 19 to have improved rigidity and processing accuracy, and the application roller 19 having a diameter of 60 mm or greater cannot have the aforementioned effect due to an excessively enlarged contact area with the substrate 1.

Incidentally, in general, the substrate 1 for use with this type of intermittent coating apparatus is a sheet-shaped substrate that is reduced in thickness. For example, to manufacture battery electrode plates, a collector of copper foil or aluminum foil of about 10 μm in thickness is used as the substrate 1. To accurately deposit a coating of the coating agent 18 in a predetermined shape on the substrate 1 which has a reduced thickness as described above, the substrate 1 has to pass through at least the coating station 3 under a certain tension that is controlled so as not to cause a stretch, wrinkle, traction or the like therein, thereby preventing unevenness in the coating resulting from varying amounts of application of the coating agent 18. In particular, as in this embodiment, when in the coating station 3, the substrate 1 is brought into contact with the application roller 19 that is rotating in the direction of rotation opposite to the direction of travel of the substrate 1, frictional force is produced between the substrate 1 and the application roller 19, thereby readily causing a stretch, wrinkle, traction or the like on the substrate 1 reduced in thickness.

In this context, the aforementioned intermittent coating apparatus employs the application roller 19 reduced in diameter R to 50 mm, thereby decreasing the contact area of the substrate 1 with the application roller 19 to provide significantly reduced frictional force between the substrate 1 and the application roller 19. In addition to this, the aforementioned intermittent coating apparatus employs small rollers having a diameter of 50 mm, which is the same as that of the application roller 19, as the reference roller 4 and the actuation roller 7 which are disposed above the application roller 19 before and after it in the direction of travel of the substrate 1 in the coating station 3, respectively. In addition, the reference roller 4 and the actuation roller 7 are disposed oppositely in close proximity to each other with the interaxial distance D (FIG. 1) therebetween defined within a small range of 1.2 times or more than and 2.5 times or less than the diameter R of the application roller 19. This allows for preventing a stretch, wrinkle, traction or the like from being produced on the substrate 1 while as low a tension as possible is exerted on the substrate 1 between the reference roller 4 and the actuation roller 7.

Accordingly, even with the substrate 1 reduced in thickness, since the reference roller 4 and the actuation roller 7 are closely disposed, the substrate 1 is maintained under a constant tension only by applying a slight tension thereto, thus never causing the substrate 1 to be cut off due to an excessively high tension applied thereto. The aforementioned interaxial distance D is set to the range of 1.2 times or more than and 2.5 times or less than the diameter R of the application roller 19. This is due to the fact that the distance D less than 1.2 times the diameter R would not allow the actuation roller 7 to smoothly come into or out of contact with the substrate 1. On the other hand, the distance D greater than 2.5 times the diameter R would cause an excessive tension to be exerted on the substrate 1, resulting in a stretch, wrinkle, traction or the like being produced thereon or in some cases, a break being produced on the substrate 1 that has been reduced in thickness.

The aforementioned description is directed to the step of forming a thin film on the substrate 1 while the coating agent 18 is being intermittently transferred and applied thereto in the arrangements shown in FIGS. 1 and 2. During this step, when it is determined based on data read from the memory 22 that the thin film being applied has reached its trailing edge, the controller 21 delivers an instruction signal to the motor driver 30 to provide control such that the actuation roller pivoting servo motor 11 is rotated in the reverse direction by the rotational angle corresponding to the aforementioned data. Accordingly, as shown in FIG. 2, the actuation roller 7 is acted upon by the rotational force of the servo motor 11 via the rotation axis 10 and the active coupling rod 12 to move along the pivotal path about the rotation axis 10 as the fulcrum. This causes the substrate 1 to displace from the position indicated with the chain double-dashed line to the position indicated with the solid line, and thereby retreat towards the backside thereof. This in turn causes the substrate 1 to move above the application roller 19 as it is released from being pressed against the application roller 19 by the actuation roller 7. The substrate 1 continues to run at that position above the application roller 19, thereby allowing a non-coating deposited section free of the coating agent 18 to be continuously formed on the undersurface of the substrate 1.

On the other hand, from the point in time at which the controller 21 has delivered an instruction signal for the motor driver 30 to displace the actuation roller 7, the controller 21 computes a value at which the difference between the detected air pressure value supplied from the air pressure detection portion 33 of the air cylinder 17 and a reference value becomes zero. Then, the controller 21 delivers the resulting value to the cylinder actuating portion 32 as a control signal. In this manner, the controller 21 provides feedback control to keep the air pressure of the air cylinder 17 consistent with the reference value all the time.

The air pressure of the aforementioned air cylinder 17 corresponds to the reactive force resulting from the tension applied to the substrate 1. Thus, the force to push the substrate 1 against the application roller 19 is gradually reduced as the actuation roller 7 moves, and at the same time, the tension applied to the substrate 1 will be also reduced. In response to this, the air cylinder 17 is driven to discharge so as to maintain the air pressure at the predetermined value. Thus, the tension roller 8 receives the drive force of the air cylinder 17 at its own spindle 8a, and is moved along the pivotal path about the pivotal spindle 13 as the fulcrum from the position indicated with the chain double-dashed line of FIG. 2 to the position indicated with the solid line, thereby allowing the substrate 1 to be advanced, i.e., pushed out towards the frontside thereof at the same time. That is, the tension roller 8 is moved to push out the substrate 1 towards the frontside thereof so as to follow the actuation roller 7 being moved to retreat the substrate 1 towards the backside thereof. Thus, the substrate 1 is pushed out towards the frontside thereof so that the tension applied to the substrate 1 is kept at the predetermined value. Consequently, in the step where the actuation roller 7 is moved away, the substrate 1 is looped under tension between the reference roller 4 and the tension roller 8 without almost no slack present.

In addition, the aforementioned intermittent coating apparatus effects a transition from a coating deposited section of thin film to a non-coating deposited section only by moving the small actuation roller 7 with a diameter of 50 mm along the pivotal path about the rotation axis 10 as the fulcrum, thereby realizing switching with significantly good responsivity. In addition, as described above, the apparatus provides control to keep the tension constant which is applied to the substrate 1 at the time of transition from the coating deposited section to the non-coating deposited section, and thus prevent slack from occurring in the substrate 1, thereby allowing the coating agent 18 to be applied uniformly to the substrate 1 all the time. Accordingly, even when an extremely thin film reduced in thickness to 20 µm or less is formed on the substrate 1 reduced in thickness, the trailing coating edge of the thin film will not be wavy as is in the conventional case along the width of the substrate 1 but accurately in the shape of a straight line.

Furthermore, when it is determined that the trailing edge of the non-coating deposited section has been reached, the controller 21 delivers an instruction signal to the motor driver 30 to provide control such that the actuation roller pivoting servo motor 11 is rotated by a rotational angle corresponding to data from the memory 22. This causes the actuation roller 7 to move along the pivotal path about the rotation axis 10 as the fulcrum from the position indicated in FIG. 2 to the position indicated in FIG. 1. Thus, the substrate 1 advances again towards the frontside thereof to restore the state in which it is pressed against the application roller 19, and the thin film starts to be formed on the undersurface of the substrate 1. At this time, since the substrate 1 is brought into contact with the application roller 19 by the actuation roller 7 on the side where the doctor blade 24 is disposed (on the left side in FIGS. 1 and 2) or at a position where the coating agent 18 is applied, the position of the thin film being formed on the substrate 1 is determined very accurately. This effect is also obtained when the substrate 1 is spaced apart from the application roller 19.

In addition, from the point in time at which the controller 21 has delivered an instruction signal for the motor driver 30 to displace the actuation roller 7, the controller 21 computes a value at which the difference between the detected air pressure value supplied from the air pressure detection portion 33 of the air cylinder 17 and a reference value becomes zero. Then, the controller 21 delivers the resulting value to the cylinder actuating portion 32 as a control signal. In this manner, the controller 21 provides feedback control to keep the air pressure of the air cylinder 17 consistent with the reference value all the time. That is, the substrate 1 is gradually pushed against the application roller 19 as the actuation roller 7 moves, and at the same time, the tension applied to the substrate 1 increases. In response to this, the air cylinder 17 is driven so as to maintain the air pressure at the predetermined value. Accordingly, as the air cylinder 17 retracts to reduce its pushing force, the tension roller 8 is subjected to the increasing tension of the substrate 1 and thus moved along the pivotal path about the pivotal spindle 13 as the fulcrum from the position indicated in FIG. 2 to the position indicated in FIG. 1, while absorbing an increase in tension of the substrate 1 at the same time.

That is, the aforementioned tension roller 8 is moved to retreat the substrate 1 towards the backside thereof so as to follow the actuation roller 7 being moved to advance the substrate 1 towards the frontside thereof. The tension roller 8 serves to absorb an increase in tension of the substrate 1 so that the tension applied to the substrate 1 is kept at a predetermined value. Consequently, the leading coating edge of the thin film along the direction of travel is formed along its width in a straight line with accuracy.

In addition, when switching from the coating deposited section of the thin film to the non-coating deposited section, the aforementioned intermittent coating apparatus moves only the actuation roller 7 so as to retreat the substrate 1 towards the backside thereof. Even when the actuation roller 7 is spaced apart from the substrate 1 in its final stage, the substrate 1 is traveling looped over the reference roller 4 which is disposed in place all the time. Accordingly, unlike the conventional apparatus of FIG. 6 where the pair of attitude control rollers 41 and 42 are spaced apart from the substrate 40 together in pairs, the substrate 1 is traveling at the reference position in the coating station 3 on the reference roller 4, which is stationary in position, even when the substrate 1 is spaced apart from the application roller 19. Thus, when the non-coating deposited section is switched to the coating deposited section of the thin film, the actuation roller 7 is restored to the original position that is determined with respect to the reference roller 4, thereby allowing the intermittent coating of the thin film to be deposited with further improved accuracy. Furthermore, since the actuation roller 7 is moved using as drive source the rotational force of the servo motor 11, the rotational angle of which is controlled with high accuracy, the destination of movement is positioned with high accuracy.

Figure 5A:
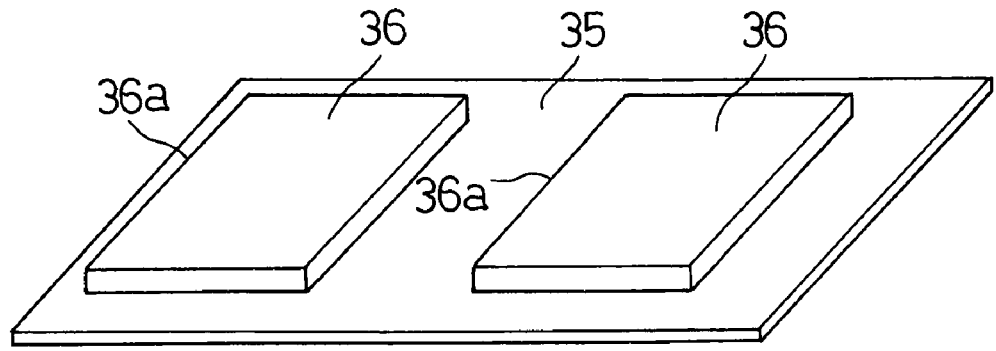
FIGS. 5A to 5C are views illustrating the procedural steps of manufacturing a battery electrode plate using the intermittent coating apparatus, the steps being shown in the order in which they appear, FIG. 5A being a perspective view illustrating a collector with active material layers formed thereon, FIG. 5B being a partially exploded perspective view illustrating a porous protective film formed to cover the active material layer.
Figure 5B:
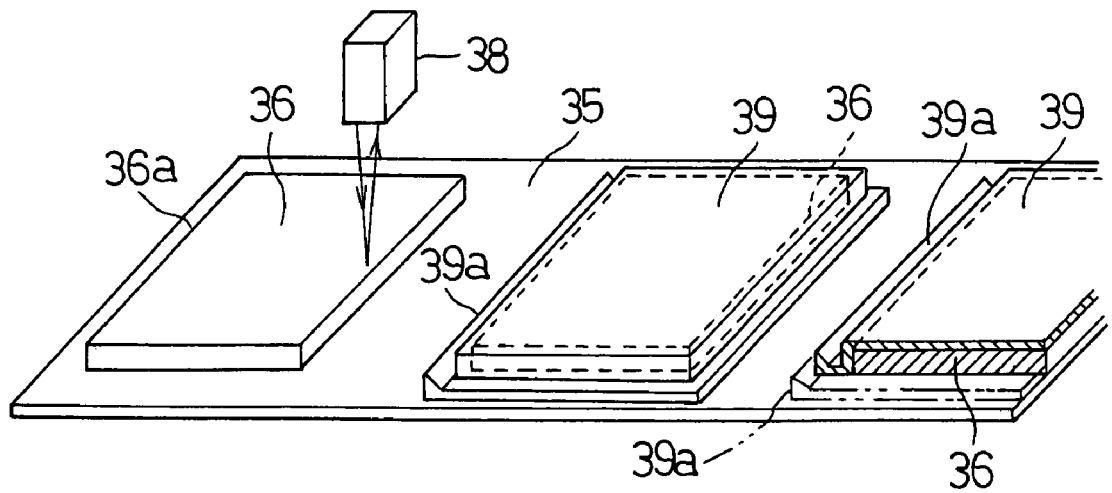
Figure 5C:
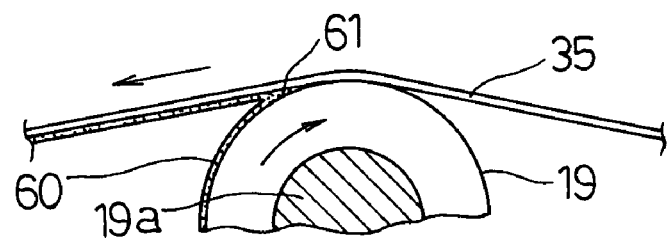

Now, a description will be given to the steps of manufacturing a battery electrode plate using the aforementioned intermittent coating apparatus, with reference to FIGS. 5A to 5C showing the steps in the order in which they appear. First, as shown in FIG. 5A, with a band-shaped collector 35 of copper foil or aluminum foil employed as a substrate, coating deposit layers 36 or active material layers are intermittently formed as a positive electrode or negative electrode on the surface of the collector 35. Here, the collector 35 is 10 μm in thickness and the active material layers 36 are 90 μm in thickness. One of the non-coating deposited sections present on both sides of the active material layer 36 on the collector 35 is used as a lead connection portion.

Note that the active material layer 36 is formed of a slurry mixture of an active material. To form the positive electrode, for example, a composite oxide such as lithium cobalt oxide and its denatured one (such as its solid solution with aluminum or magnesium) is used as the active material to be mixed with a binder and a conductive agent, and the resulting mixture is mixed and kneaded until an optimal viscosity is obtained. To form the negative electrode, for example, various types of natural graphite and artificial graphite, and silicon-based composite materials such as silicide are used as the active material to be mixed with a binder and a conductive agent, and the resulting mixture is mixed and kneaded until an optimal viscosity is obtained.

Subsequently, as shown in FIG. 5B, while the collector 35 having the active material layers 36 formed thereon is traveling as the substrate, the leading edges and the trailing coating edges 36*a* in the direction of travel of the active material layer 36 are detected with a reflective optoelectronic sensor 38. As shown with the chain double-dashed line in FIG. 3, based on the detected positions, the controller 21 computes the application pitch. In accordance with the calculated application pitch, a coating agent or a kneaded mixture of inorganic oxide, used as a filler, and a small amount of binder is applied intermittently from just before the leading coating edge of the active material layer 36 to behind the trailing coating edge 36*a*, thereby forming a porous protective film 39 that covers the entirety of the active material layer 36. The battery electrode plate is completed in this manner. The porous protective film 39 is as extremely thin as about 6 μm when dried. As described above, even the porous protective film 39 reduced in thickness as such can also be formed with high accuracy using the aforementioned intermittent coating apparatus.

An inorganic oxide is used as the filler for the aforementioned coating agent, for example, because resistance to heat is required of the battery electrode plate, and an inorganic oxide is most preferred as a material that suits a coating agent while satisfying the requirements for electrochemical stability within the service range of the lithium ion rechargeable battery. Furthermore, since alumina is most preferably used as the inorganic oxide in terms of electrochemical stability, a small amount of binder is added to those grains of alumina about 1.2 μm in diameter, and the resulting mixture is mixed and kneaded into a coating agent for use.

On the other hand, as clearly illustrated in FIG. 5B, although the porous protective film 39 is formed in this manner, the trailing edge portion 39*a* would not take a wavy shape along the width of the collector 35 but a straight line with accuracy for the reason mentioned above. It also takes a swelling shape of film that slightly arises from the other portion. The trailing edge portion 39*a* having such a swelling shape is formed as follows. That is, as shown in FIG. 5C, the application roller 19 that is rotated in a direction opposite to the direction of travel of the collector 35 serving as a substrate rotates at a faster rotational speed than the travel speed of the collector 35. The difference in speed between the collector 35 and the application roller 19 causes a small amount of coating agent 60 to remain in a small space 61, which is defined in the shape of a wedge in cross section towards the side of supply of the coating agent 60, at the contact portion between the application roller 19 and the collector 35. When the collector 35 is separated from the application roller 19, this small amount of the coating agent 60 is deposited on the collector 35 as it is, to form the trailing edge portion 39*a* in the swelling shape.

However, since the trailing edge portion 39*a* is formed in the aforementioned swelling shape on the collector 35 that is located behind the trailing coating edge 36*a* of the active material layer 36, the tip will not become higher than the top face of the active material layer 36. Thus, this will not inhibit its use as the battery electrode plate without causing any problem.

Incidentally, the method for intermittently applying thin-film coatings according to this embodiment provides the following outstanding effects. That is, such simple means as for retreating the actuation roller 7 from the backside of the substrate 1 and moving the actuation roller 7 towards the frontside thereof switches between the coating deposited section of the thin film and the non-coating deposited section. It is thus possible to perform the switching with very good responsivity. In addition, when the actuation roller 7 moves to come into or out of contact with the substrate 1 in conjunction therewith, the tension roller 8 is controllably moved with respect to the substrate 1 to follow the movement of the actuation roller 7, so that the tension applied to the substrate 1 is maintained at a predetermined value all the time. Thus, in the step where the actuation roller 7 comes into or out of contact with the substrate 1, the substrate 1 is kept looped under tension between the reference roller 4 and the tension roller 8. This allows for producing almost no slack in the substrate 1, thereby making it possible to uniformly apply the coating agent 18 on the substrate 1 all the time. Accordingly, even when such an extremely thin film as 20 μm or less in thickness is formed on the substrate 1 reduced in thickness, an outstanding effect is obtained that the trailing coating edge of the thin film is formed in the shape of a straight line accurately by application without becoming wavy along the width of the substrate 1 unlike the conventional case.

However, the aforementioned intermittent coating method provides the aforementioned outstanding effects when the substrate 1 having a relatively narrow width is transferred within a certain range of travel speeds. The substrate 1 being relatively wide, for example, 500 mm or greater in width would cause new problems to occur which have not been yet overcome.

That is, the aforementioned intermittent coating method provides control for the tension roller 8 to be moved with respect to the substrate 1 to follow the actuation roller 7 being moved away from the substrate 1 so that the tension applied thereto is maintained at a predetermined value all the time. Here, what is most important to maintain uniform contact all the time between the substrate 1 and the application roller 19 is to allow the tension at a portion on the substrate 1 facing with the application roller 19 to be kept constant all the time.

The aforementioned tension at the portion on the substrate 1 facing with the application roller 19 is given during application of a coating of the coating agent 18 by allowing the substrate 1 to be looped under tension over the short distance between the reference roller 4 and the actuation roller 7, which are disposed as closely to each other as possible. However, at the time of forming trailing coating edge of the thin film at which the substrate 1 is separated from the application roller 19, the tension is provided by allowing the substrate 1 to be looped under tension over a relatively long distance between the reference roller 4 and the tension roller 8. At this time, the slack in the substrate 1 to be produced by the actuation roller 7 being moved to retreat the substrate 1 towards the backside thereof is absorbed by the tension roller 8 advancing to the substrate 1 to exert tension to the substrate 1. When the substrate 1 is wider, in the relatively long region on the substrate 1 between the reference roller 4 and the tension roller 8, a slight wavy slack would occur along the width of the substrate 1 when the substrate 1 is separated from the application roller 19, thereby causing unevenness in the coating of the coating agent 18. Thus, part of the trailing coating edge of is the thin film would not take the shape of an accurate straight line. The aforementioned wavy slack occurs in the substrate 1 because the wide substrate 1 has strain produced along its width at the time of manufacture thereof. The slack occurs also because when the substrate 1 is separated from the application roller 19, the tension at the portion on the substrate 1 facing with the application roller 19 is provided by the substrate 1 being looped under tension between the reference roller 4 and the tension roller 8, which are relatively spaced apart from each other.

Figure 6:
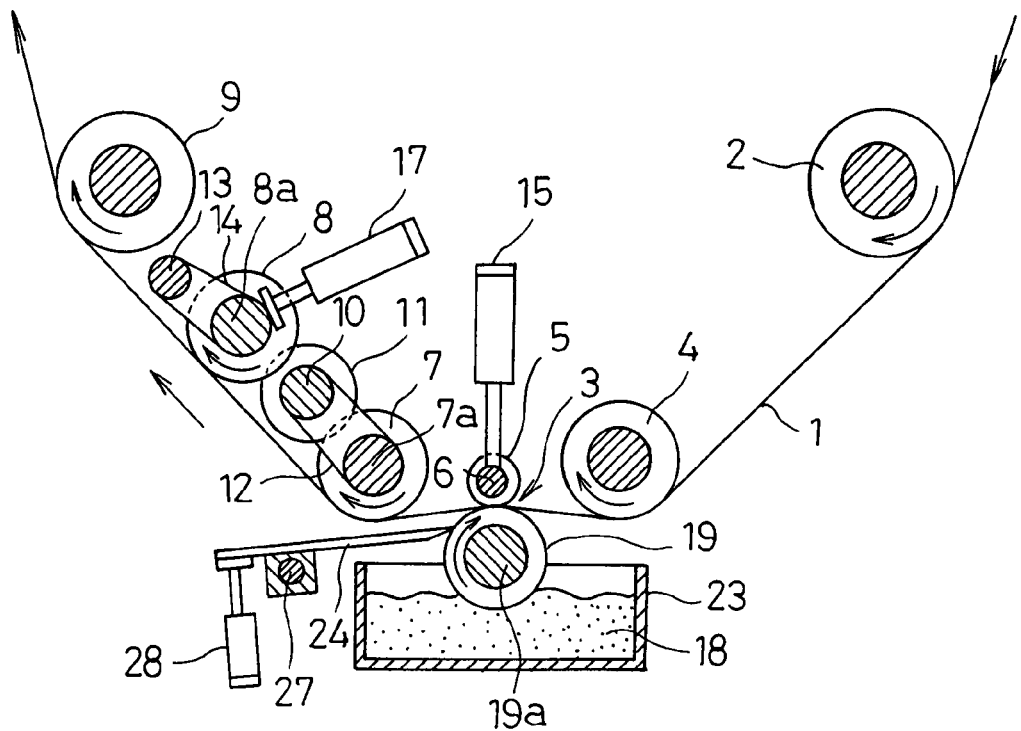
FIG. 6 is a schematic longitudinal sectional view illustrating a coating of thin film being deposited in an intermittent coating apparatus representative of another embodiment which embodies a method for intermittently applying thin-film coatings according to the present invention.
Figure 7:
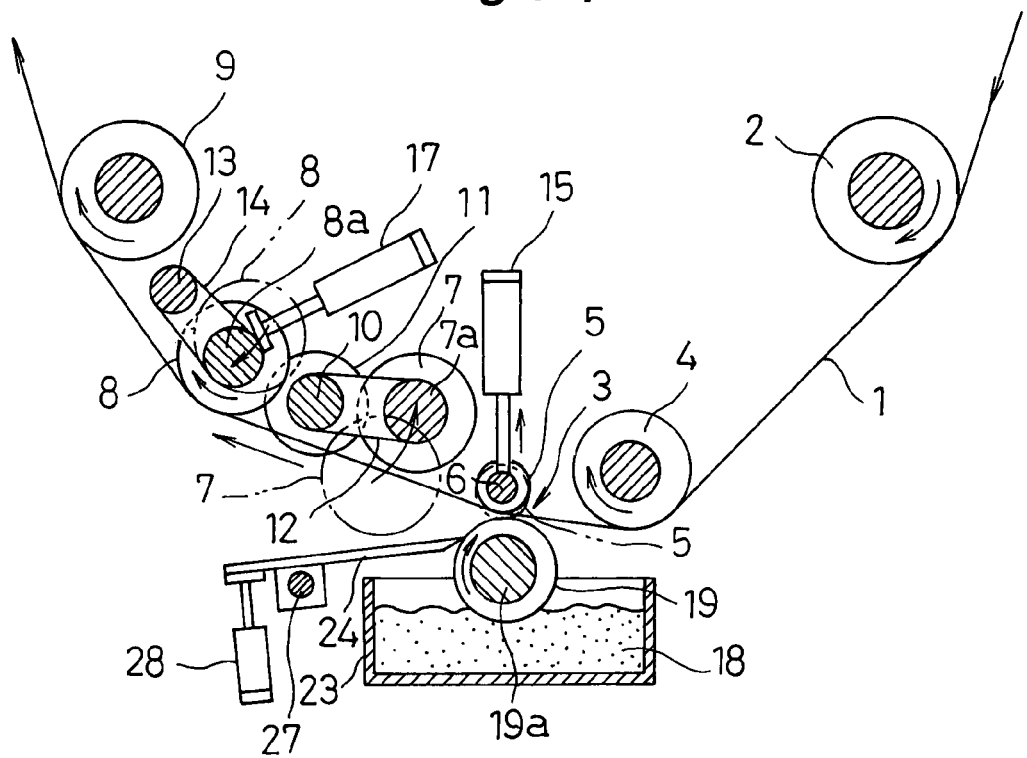
FIG. 7 is a schematic longitudinal sectional view illustrating a coating of thin film being not deposited in the intermittent coating apparatus.

Now, in light of the aforementioned problems, another further improved embodiment shown in FIGS. 6 and 7 is provided in contrast to the embodiment shown in FIGS. 1 and 2. This embodiment is adapted to be able to form a thin film that has a trailing coating edge in a highly accurate good linear shape even when a coating of coating agent is intermittently deposited on a relatively wide substrate at high speeds.

To describe this embodiment, FIG. 6 and FIG. 7 show a coating of thin film being deposited and a coating of thin film being not deposited, respectively. As shown in FIGS. 6 and 7, in the coating station 3, the substrate 1 is looped over the reference roller 4 and the actuation roller 7, which are spaced apart from each other by an interaxial distance that is a little longer than that in the previous embodiment. The substrate 1 is allowed to pass through between a backup roller 5, which is disposed halfway between the reference roller 4 and the actuation roller 7, and the application roller 19 below the backup roller 5. The substrate 1 is supported on the backside thereof between the reference roller 4 and the backup roller 5 and between the backup roller 5 and the actuation roller 7, and allowed to travel under respective constant tension therebetween. While the substrate 1 is traveling, the backup roller 5 applies a predetermined pressure to the substrate 1 to bring it into contact with the application roller 19 that is disposed on the frontside thereof, thereby allowing the coating agent 18 carried on the circumferential surface of the application roller 19 to be transferred to the surface of the substrate 1 to deposit and form a thin film. The other configurations are the same as those of the embodiment shown in FIGS. 1 and 2, and those common components are indicated with the same symbols without any further description.

A spindle 6 for rotatably supporting the backup roller 5 is coupled to an air cylinder 15. At the time of forming the coating deposited section of thin film, the backup roller 5 is retained so that its own lower end is positioned slightly above a horizontal line that connects between each of the lower ends of the reference roller 4 and the actuation roller 7 (as indicated with the solid line of FIG. 6 and the chain double-dashed line of FIG. 7, respectively). On the other hand, at the time of forming the coating deposited section of the thin film, the backup roller 5 is driven by the air cylinder 15 to be lifted up to the upper limit position indicated with the solid line of FIG. 6. Here, the backup roller 5 is lifted up from the position of the chain double-dashed line of FIG. 7 to the position of the solid line not at a time but moved upward so as to follow the tension roller 8 being moved. This will be described in more detail below.

Below the aforementioned backup roller 5, the application roller 19 intended to transfer and deposit a coating of the coating agent 18 on the downward surface of the substrate 1 in the figure is provided at such a vertical position that allows the substrate 1 to be sandwiched between the application roller 19 and the backup roller 5 that is positioned at a vertical position at which the coating deposited section of thin film is formed.

Figure 8:
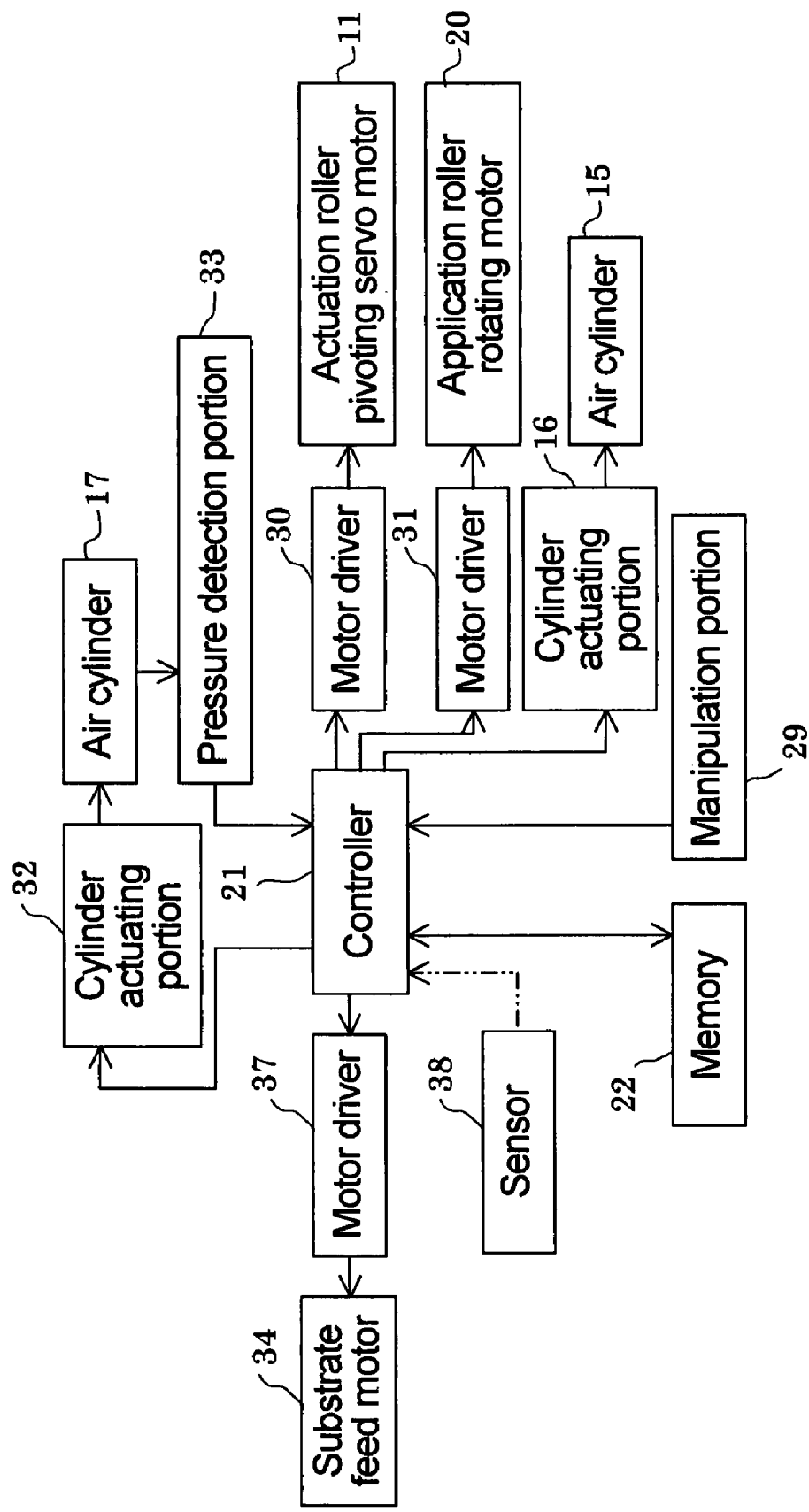
FIG. 8 is a block diagram illustrating a drive control system in the intermittent coating apparatus.
Figure 9:
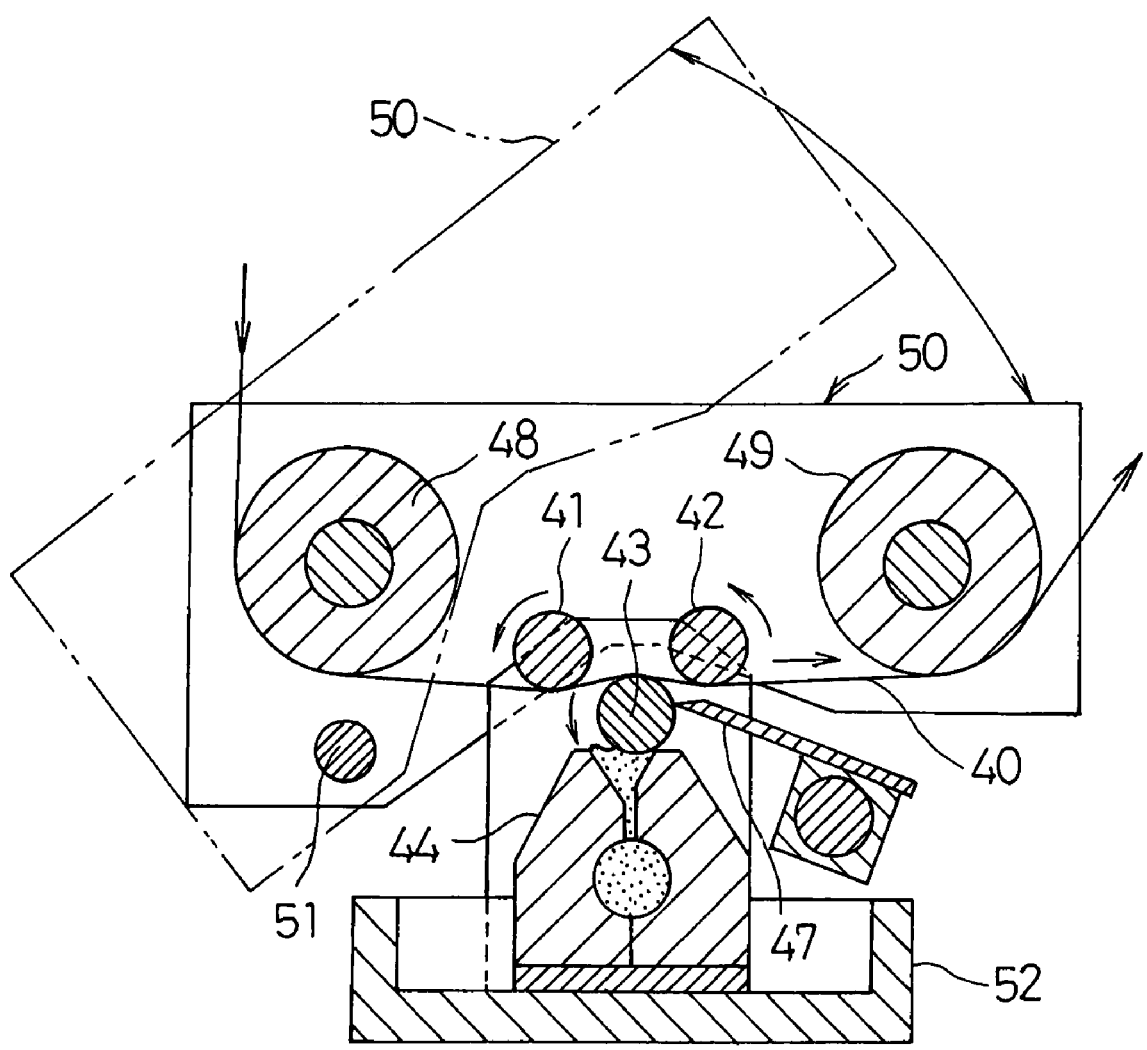
FIG. 9 is a schematic longitudinal sectional view illustrating a conventional gravure coating apparatus.
Figure 10A:
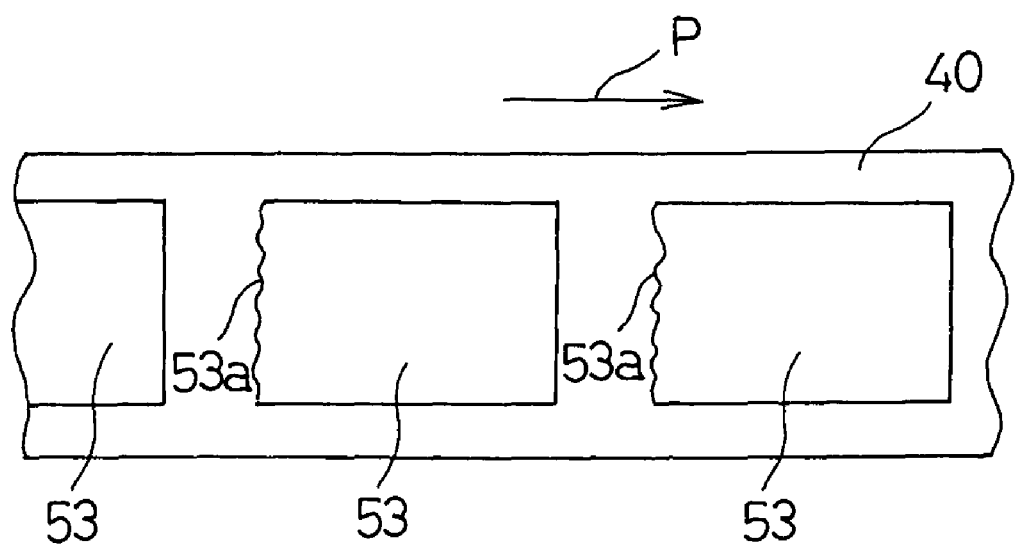
FIGS. 10A to 10B are views illustrating the shape of thin film formed in the gravure coating apparatus, FIG. 10A being a plan view, and FIG. 10B being a longitudinal sectional view.
Figure 10B:
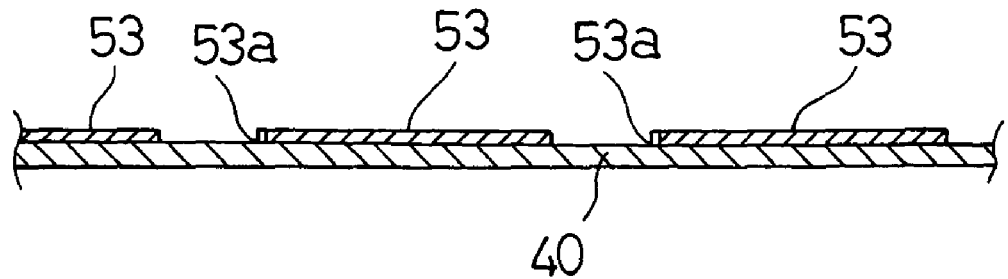

FIG. 8 is a block diagram illustrating a drive control system of the aforementioned intermittent coating apparatus according to this embodiment. Following the timing with which the air cylinder 17 provides retreat and advance control for the tension roller 8 to retreat from the backside of the substrate 1 and advance towards the frontside thereof, the controller 21 controllably drives the air cylinder 15 of FIGS. 6 and 7 via a cylinder actuating portion 16, thereby controllably moving the backup roller 5 up and down. The other parts of control provided by the controller 21 are the same as those of the embodiment shown in FIGS. 1 and 2, and those common components are indicated with the same symbols without any further description.

Now, a description will be made to the detailed configuration of the aforementioned intermittent coating apparatus and the steps of intermittent coating. As clearly illustrated in FIG. 6, the operational control provided by the controller 21 of FIG. 3 allows the actuation roller 7 to be flush with the reference roller 4 in parallel and opposing relation to each other. When the substrate 1 is advanced towards the frontside thereof, i.e., downwardly to be in contact with the application roller 19, the backup roller 5 positioned halfway between the actuation roller 7 and the reference roller 4 is retained at the lower limit position where the air cylinder 15 presses the substrate 1 against the application roller 19 at a predetermined contact pressure. The coating agent 18 filled in the coating agent retaining grooves 19*b* of the application roller 19 is transferred and applied to the portion on the substrate 1 that is pressed against the application roller 19 by the backup roller 5. Accordingly, even when the coating agent 18 is intermittently applied to the relatively wide substrate 1, the backup roller 5 prevents up-and-down movements or waving of the substrate 1 that are caused by a coating of the coating agent 18 being repeatedly deposited or not deposited. This allows the substrate 1 to be constantly in contact with the application roller 19 at a predetermined pressure, thereby preventing unevenness in the coating of the coating agent 18 and depositing the coating uniformly with stability. In this manner, irrespective of the travel speed of the substrate 1, the deposited coating agent 18 is formed into a thin film in a highly accurate shape without unevenness in the coating on the undersurface of the substrate 1.

The description above is directed to the step of forming a thin film while the coating agent 18 is being transferred and applied to the substrate 1 in cooperation with the backup roller 5 and the application roller 19 which are disposed as shown in FIG. 6. In the step, when it is determined based on data read from the memory 22 that the thin film being applied has reached the trailing coating edge, the controller 21 allows the actuation roller 7 to move along the pivotal path about the rotation axis 10 as the fulcrum and thus from the position indicated with the chain double-dashed line to the position indicated with the solid line. While the substrate 1 is being thus moved to retreat towards the backside thereof, the actuation roller 7 is separated from the substrate 1 in the final stage. Simultaneously, from the point in time at which an instruction signal has been outputted to move the actuation roller 7, the air pressure of the air cylinder 17 is kept constant at a reference value all the time, thereby moving the tension roller 8 to advance the substrate 1 towards the frontside thereof so as to follow the actuation roller 7 being moved to be separated from the substrate 1. Thus, the tension roller 8 pushes out the substrate 1 so as to maintain the tension applied to the substrate 1 at a predetermined value. Accordingly, in the step of the actuation roller 7 being separated from the substrate 1, the substrate 1 is looped under tension between the backup roller 5 and the tension roller 8 without almost no slack present.

In addition, the controller 21 delivers an instruction signal to the motor driver 30 to provide rotational control to the actuation roller pivoting servo motor 11. At the same time, the controller 21 delivers an instruction signal to the cylinder actuating portion 16 to drive the air cylinder 15, thereby moving the backup roller 5 a predetermined distance by which the substrate 1 is slightly separated from the application roller 19. At this time, the controller 21 controllably actuates the air cylinder 15 via the cylinder actuating portion 16 such that the backup roller 5 moves away from the application roller 19 at a speed corresponding to the detected air pressure value supplied from the air pressure detection portion 33.

As described above, the backup roller 5 is moved to follow the tension roller 8 being actuated. In particular, is when the substrate 1 used is relatively as wide as 500 mm or greater in width, most of the slack produced in the substrate 1 by the actuation roller 7 moving away from the substrate 1 is absorbed by the tension roller 8 advancing towards the substrate 1 to thereby exert tension on the substrate 1. In addition, a slight wavy slack which is produced along the width of the wide band-shaped substrate 1 due to the strain of the substrate 1 caused during its manufacture is absorbed by the backup roller 5 providing a predetermined tension over a region on the substrate 1 between it and the tension roller 8. In this manner, even with the wide substrate 1, wavy slack is prevented from occurring along the width thereof. It is thus possible to form the trailing coating edge of thin film in the shape of an accurate straight line without unevenness in the coating of the coating agent 18.

In addition, when the substrate 1 travels faster, the backup roller 5 allows the substrate 1 to be constantly in contact with the application roller 19 at a predetermined pressure all the time as described above, thereby preventing unevenness in the coating of the coating agent 18 and depositing it uniformly with stability. In addition to this, the time for the substrate 1 to be in contact with the application roller 19 is reduced as it travels faster, and thus the timing with which the tension roller 8 is moved to advance so as to follow the actuation roller 7 is likely to be slightly delayed. When the substrate 1 is about to leave the application roller 19, a wavy slack caused by this delay is produced along the width of the substrate 1. However, this slack is absorbed by the backup roller 5 being actuated following the tension roller 8. Accordingly, even when the substrate 1 travels faster, it is possible to ensure that a coating of thin film is deposited and formed to have a trailing coating edge in the shape of an accurate straight line.

In addition, when it is determined that the trailing edge of a non-coating deposited section has been reached, the controller 21 allows the actuation roller 7 to move along the pivotal path about the rotation axis 10 as the fulcrum from the position indicated in FIG. 7 to the position indicated in FIG. 6, thereby restoring the substrate 1 to be again pressed against the application roller 19 and allowing the thin film to start to be formed on the undersurface of the substrate 1.

In addition, from the point in time at which the controller 21 has delivered an instruction signal for the motor driver 30 to move the actuation roller 7, i.e., as the actuation roller 7 moves causing the substrate 1 to be pushed against the application roller 19 with an increase in tension, the controller 21 provides control such that the air pressure of the air cylinder 17 is kept constant at a reference value all the time. This allows the tension roller 8 to absorb an increase in the tension of the substrate 1 while the pressure exerted on the substrate 1 is reduced as the air cylinder 17 retracts and the tension roller 8 subjected to the increase in the tension of the substrate 1 is moved from the position indicated in FIG. 2 to the position indicated in FIG. 1.

The controller 21 provides operational control to the air cylinder 15 via the cylinder actuating portion 16 such that the backup roller 5 moves into close proximity to the application roller 19 at a speed associated with the detected air pressure value that is supplied from the air pressure detection portion 33 corresponding to the operating state of the aforementioned tension roller 8. Accordingly, a slight wavy slack which is produced along the width of the wide band-shaped substrate 1 due to the strain of the substrate 1 caused during its manufacture is absorbed by the backup roller 5 providing a predetermined tension over a region on the substrate 1 between it and the tension roller 8. The leading coating edge in the direction of travel of the thin film is thus accurately formed in a straight line along its width.

INDUSTRIAL APPLICABILITY

As described above, according to the present invention, even while a coating of extremely thin film reduced to 20 μm or less in thickness is intermittently applied and deposited with high productivity, its trailing coating edge is formed in a highly accurate shape having good linearity. Thus, among other things, the present invention is suitably applied to the step of forming an active material layer for battery electrode plates and its porous protective film.

What is claimed is:

1. A method for intermittently applying thin-film coatings, comprising:
   looping a band-shaped substrate (1, 35) on a backside thereof over a stationary reference roller (4) and an actuation roller (7), which are disposed oppositely in parallel to each other; supporting a portion to be applied with a coating agent (18) in parallel to the reference roller and the movable actuation roller and allowing the portion to travel in one direction; bringing an application roller (19) carrying a coating agent into contact with the substrate halfway between the reference roller and the actuation roller so that the coating agent is transferred and deposited onto the surface of the substrate to thereby deposit and form a coating of thin film;

moving the actuation roller with a predetermined timing to be retreated from the backside of the substrate to thereby separate the substrate from the application roller; in synchronization with this, moving a tension roller (8) to be advanced towards the frontside of the substrate and thereby provide tension on the substrate;

after that, moving the actuation roller with a predetermined timing to be advanced towards the frontside of the substrate to bring the substrate into contact with the application roller; in synchronization with this, moving the tension roller to be retreated from the backside of the substrate to reduce the tension exerted on the substrate and to form the thin film is formed on the surface of the substrate on an intermittent basis; and providing control such that, for the tension applied to the substrate to be kept constant all the time, the tension roller is moved to be retreated from the backside of the substrate and to be advanced towards the frontside thereof so as to follow the actuation roller being moved to be retreated from the backside of the substrate.

2. The method for intermittently applying thin-film coatings according to claim 1, wherein the actuation roller (7) and the tension roller (8) are disposed in front of the application roller (19) in a direction of travel of the substrate (1).

3. The method for intermittently applying thin-film coatings according to claim 1, wherein the application roller (19) having a diameter of 40 mm to 60 mm is used.

4. The method for intermittently applying thin-film coatings according to claim 1, wherein the reference roller (4) and the actuation roller (7) are disposed at an interaxial distance that is defined to be 1.2 times or greater than and 2.5 times or less than the diameter of the application roller (19).

5. The method for intermittently applying thin-film coatings according to claim 1, wherein: the application roller (19) is used which has a number of coating agent retaining grooves (19b) which are inscribed on the entire circumferential surface thereof at a predetermined angle relative to the roller axial center of the application roller in parallel to each other; the application roller is allowed to rotate in a direction opposite to the direction of travel of the substrate (1); and a doctor blade (24) is pushed at a constant pressure against flat surface portions (19c) that are provided between the coating agent retaining grooves adjacent to each other on the application roller, thereby allowing an excess of the coating agent (18) carried on the application roller to be scrubbed off.

6. The method for intermittently applying thin-film coatings according to claim 1, wherein a rotation axis (10) and a spindle (7a) of the actuation roller is interconnected to each other via an active coupling rod (12), and following the actuation roller (7) moving along a pivotal path about the rotation axis as a fulcrum, the tension roller (8) is made movable along the pivotal path about the rotational spindle (13) as a fulcrum, to which its own spindle (8a) is coupled via a coupling rod (14), thereby exerting a constant pressure onto the substrate (1) and thus maintaining a constant tension to be provided to the substrate.

7. The method for intermittently applying thin-film coatings according to claim 1, wherein, after a coating deposit layer (36) is deposited and formed on the surface of the substrate (35) on an intermittent basis, a leading coating edge and a trailing coating edge (36a) of the coating deposit layer are detected with a sensor (38), and a thin film (39) that covers the entire coating deposit layer is deposited and formed on an intermittent basis corresponding to the coating deposit layer.

8. The method for intermittently applying thin-film coatings according to claim 1, wherein a battery active material layer is deposited and formed as the coating deposit layer (36) on the surface of the substrate using copper foil or aluminum foil as the substrate (35), and a porous protective film is deposited and formed as the thin film (39) on the entire surface of the coating deposit layer and on part of the substrate.

9. The method for intermittently applying thin-film coatings according to claim 1, wherein a trailing edge portion (39a) of the thin film (39) in the direction of travel of the substrate (35) is formed in the shape of a straight line along the width of the substrate and in a swelling shape that is slightly thicker than a predetermined film thickness.

10. A method for intermittently applying thin-film coatings, the method comprising:

looping a band-shaped substrate (1, 35) on a backside thereof over a stationary reference roller (4) and a movable actuation roller (7), which are disposed oppositely in parallel to each other, and over a backup roller (5) which is disposed halfway between these two rollers; supporting a portion to be applied with a coating agent (18) in parallel to the reference roller and the actuation roller; allowing the backup roller to push the substrate at a predetermined contact pressure against an application roller disposed on the frontside of the substrate, to allow the substrate to travel in one direction; transferring a coating agent carried on a circumferential surface of the application roller to the surface of the substrate to deposit and form a coating of thin film;

moving the actuation roller with a predetermined timing to be retreated from the backside of the substrate to thereby separate the substrate from the application roller; in synchronization with this, moving a tension roller (8) to be advanced towards the frontside of the substrate and to thereby provide tension on the substrate, while the backup roller is moved to be retreated from the backside of the substrate and to thereby separate the substrate from the application roller; and after that, moving the actuation roller with a predetermined timing to be advanced towards the frontside of the substrate; in synchronization with this, moving the tension roller to be retreated from the backside of the substrate to reduce the tension exerted on the substrate; and moving the backup roller to advance the substrate towards the frontside thereof, allowing the substrate to be brought into contact with the application roller, thereby forming the thin film on the surface of the substrate on an intermittent basis.

11. The method for intermittently applying thin-film coatings according to claim 10, comprising for the tension applied to the substrate (1) to be kept constant all the time, controllably moving the tension roller (8) to come into or out of contact with the substrate so as to follow the actuation roller (7) moving to come into or out of contact with the substrate; and controllably moving the backup roller (5) to follow the operation of the tension roller.

12. The method for intermittently applying thin-film coatings according to claim 10, wherein the actuation roller (7) and the tension roller (8) are disposed in front of the application roller (19) in a direction of travel of the substrate (1).

13. The method for intermittently applying thin-film coatings according to claim 10, wherein the application roller (19) having a diameter of 40 mm to 60 mm is used.

14. The method for intermittently applying thin-film coatings according to claim 10, wherein the reference roller (4) and the actuation roller (7) are disposed at an interaxial distance that is defined to be 1.2 times or greater than and 2.5 times or less than the diameter of the application roller (19).

15. The method for intermittently applying thin-film coatings according to claim 10, wherein: the application roller (19) is used which has a number of coating agent retaining grooves (19*b*) which are inscribed on the entire circumferential surface thereof at a predetermined angle relative to the roller axial center of the application roller in parallel to each other; the application roller is allowed to rotate in a direction opposite to the direction of travel of the substrate (1); and a doctor blade (24) is pushed at a constant pressure against flat surface portions (19*c*) that are provided between the coating agent retaining grooves adjacent to each other on the application roller, thereby allowing an excess of the coating agent (18) carried on the application roller to be scrubbed off.

16. The method for intermittently applying thin-film coatings according to claim 10, wherein a rotation axis (10) and a spindle (7*a*) of the actuation roller is interconnected to each other via an active coupling rod (12), and following the actuation roller (7) moving along a pivotal path about the rotation axis as a fulcrum, the tension roller (8) is made movable along the pivotal path about the rotational spindle (13) as a fulcrum, to which its own spindle (8*a*) is coupled via a coupling rod (14), thereby exerting a constant pressure onto the substrate (1) and thus maintaining a constant tension to be provided to the substrate.

17. The method for intermittently applying thin-film coatings according to claim 10, wherein, after a coating deposit layer (36) is deposited and formed on the surface of the substrate (35) on an intermittent basis, a leading coating edge and a trailing coating edge (36*a*) of the coating deposit layer are detected with a sensor (38), and a thin film (39) that covers the entire coating deposit layer is deposited and formed on an intermittent basis corresponding to the coating deposit layer.

18. The method for intermittently applying thin-film coatings according to claim 17, wherein a battery active material layer is deposited and formed as the coating deposit layer (36) on the surface of the substrate using copper foil or aluminum foil as the substrate (35), and a porous protective film is deposited and formed as the thin film (39) on the entire surface of the coating deposit layer and on part of the substrate.

19. The method for intermittently applying thin-film coatings according to claim 10, wherein a trailing edge portion (39*a*) of the thin film (39) in the direction of travel of the substrate (35) is formed in the shape of a straight line along the width of the substrate and in a swelling shape that is slightly thicker than a predetermined film thickness.

\* \* \* \* \*